United States Patent
Stewart et al.

(10) Patent No.: US 11,163,643 B2
(45) Date of Patent: Nov. 2, 2021

(54) BOOT DATA VALIDITY

(71) Applicant: HEWLETT-PACKARD DEVELOPMENT COMPANY, L.P., Houston, TX (US)

(72) Inventors: Christopher H. Stewart, Houston, TX (US); Baraneedharan Anbazhagan, Houston, TX (US); Scott B. Marcak, Houston, TX (US); Rosilet Retnamoni Braduke, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 723 days.

(21) Appl. No.: 16/083,917

(22) PCT Filed: Apr. 13, 2017

(86) PCT No.: PCT/US2017/027418
§ 371 (c)(1),
(2) Date: Sep. 11, 2018

(87) PCT Pub. No.: WO2018/190846
PCT Pub. Date: Oct. 18, 2018

(65) Prior Publication Data
US 2021/0200640 A1    Jul. 1, 2021

(51) Int. Cl.
*G06F 21/64* (2013.01)
*G06F 11/14* (2006.01)
(Continued)

(52) U.S. Cl.
CPC ........ *G06F 11/1417* (2013.01); *G06F 9/4406* (2013.01); *G06F 21/575* (2013.01); *G06F 21/64* (2013.01); *G06F 2201/82* (2013.01); *G06F 2221/033* (2013.01)

(58) Field of Classification Search
CPC .. G06F 11/1417; G06F 9/4406; G06F 21/575; G06F 21/64; G06F 2201/82;
(Continued)

(56) References Cited

U.S. PATENT DOCUMENTS

| 5,355,489 A | 10/1994 | Bealkowski et al. |
| 6,640,316 B1 | 10/2003 | Martin et al. |

(Continued)

FOREIGN PATENT DOCUMENTS

| CN | 105487956 A | 4/2016 |
| TW | 200821822 A | 5/2008 |

(Continued)

OTHER PUBLICATIONS

Adamw, "Uefi Boot: How Does That Actually Work, Then?", Mandriva-Personal-Red Hat-Technical, Jan. 25, 2014, 16 Pages.

*Primary Examiner* — Michael J Brown
(74) *Attorney, Agent, or Firm* — HPI Patent Department (57) ABSTRACT

Examples associated with boot data validity are described. One example includes determining whether NVRAM boot data structure is valid. When the NVRAM boot data structure is valid, a NVRAM boot data structure validity flag is set to indicate the boot data structure is invalid. The validity flag is set to indicate the NVRAM boot data structure is valid once a point in a startup process is reached that indicates the startup process will complete successfully. When the NVRAM boot data structure is invalid, errors identified in the NVRAM boot data structure are repaired, and the startup process is restarted.

15 Claims, 6 Drawing Sheets

(51) Int. Cl.
  *G06F 9/4401* (2018.01)
  *G06F 21/57* (2013.01)
  *G06F 9/44* (2018.01)
  *G06F 11/07* (2006.01)
  *G06F 21/51* (2013.01)

(58) Field of Classification Search
  CPC ........... G06F 2221/033; G06F 11/0751; G06F 11/0793; G06F 21/51
  USPC .................................................. 713/1, 2, 100
  See application file for complete search history.

(56) References Cited

U.S. PATENT DOCUMENTS

| | | | |
|---|---|---|---|
| 6,795,835 | B2 | 9/2004 | Ricart et al. |
| 7,100,031 | B1 | 8/2006 | Reasor et al. |
| 9,292,302 | B2 | 3/2016 | Sasaki et al. |
| 2002/0103779 | A1 | 8/2002 | Ricart et al. |
| 2004/0205328 | A1* | 10/2004 | Langford ................. H04L 67/34 713/1 |
| 2004/0255106 | A1 | 12/2004 | Rothman et al. |
| 2006/0143432 | A1* | 6/2006 | Rothman ............ H04L 67/2842 713/2 |
| 2007/0174705 | A1 | 7/2007 | Shih |
| 2008/0270782 | A1 | 10/2008 | Bone et al. |
| 2009/0300415 | A1 | 12/2009 | Zhang et al. |
| 2016/0063254 | A1 | 3/2016 | Jeansonne et al. |
| 2016/0180094 | A1 | 6/2016 | Dasar et al. |

FOREIGN PATENT DOCUMENTS

| | | |
|---|---|---|
| TW | 201333684 A | 8/2013 |
| TW | 201342049 A | 10/2013 |
| TW | 201640363 A | 11/2016 |

\* cited by examiner

BOOT DATA VALIDITY

BACKGROUND

When a system boots up, the system eventually transitions from a basic input/output system (BIOS) mode to an operating system mode. While in BIOS mode, the system runs several integrity checks to ensure the system will boot into the operating system mode successfully and securely. Some of these checks are over boot data stored in the system's non-volatile random access memory (NVRAM).

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with boot data validity are described. As discussed above, many integrity checks are made during a system's startup process to ensure successful and secure booting of the system into a mode operable for users for which the system is designed. While individual checks may take a small amount of time, eventually these checks may add up to a noticeable delay in system startup. Further, it is often the case that no errors are found by the integrity checks. Thus, it may be desirable to bypass checking during each startup of the system while still tracking to see if something went wrong so that a full integrity check can be performed.

Consequently, systems and methods disclosed herein teach using a flag or other validity indicator stored in a manner accessible to the basic input/output system (BIOS) that allows tracking whether a recent boot of a system was successful for the purpose of bypassing non-volatile random access memory (NVRAM) boot data structure integrity checking. During boot, the validity indicator is checked, and when the validity indicator indicates the NVRAM boot data structure is valid, integrity checking is bypassed for this boot. Instead, the validity indicator is set to indicate the NVRAM boot data structure is invalid until the system reaches a point in its startup process which itself can be used as evidence the NVRAM boot data structure is valid. After reaching this execution point, the validity indicator can be returned to the state indicating the NVRAM boot data structure is valid, and the system may finish starting up.

If the system instead crashes during its startup process, the NVRAM validity indicator may maintain its invalid state into the next startup, at which point the validity indicator may indicate that the NVRAM boot data structure may be invalid. This may cause a thorough integrity check of the NVRAM boot data structure, at which point repairs to the NVRAM boot data and/or its structure may be made if corruption of the NVRAM boot data structure is detected.

Figure 1:
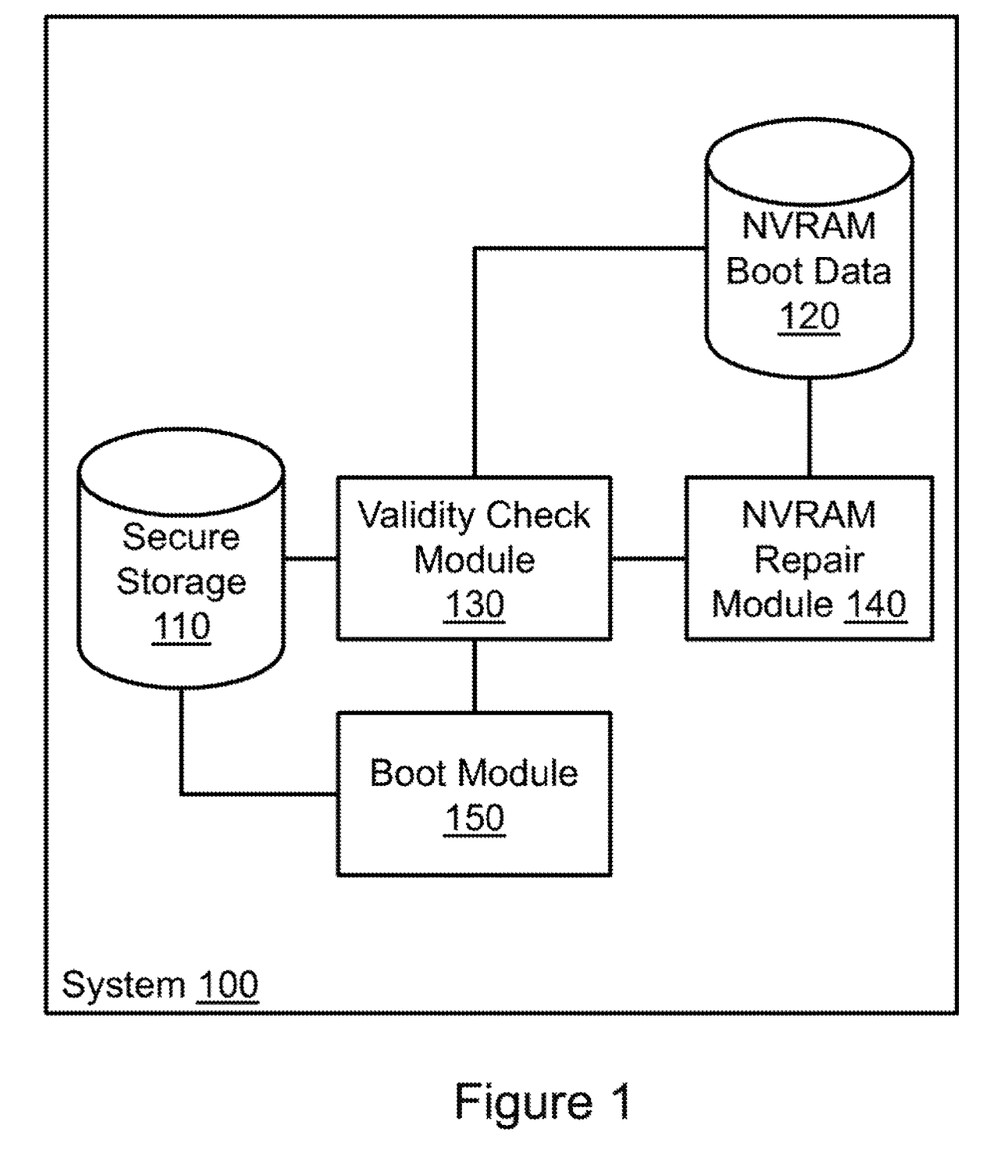
FIG. 1 illustrates example devices associated with boot data validity.

FIG. 1 illustrates an example system associated with boot data validity. It should be appreciated that the items depicted in FIG. 1 are illustrative examples, and many different systems, devices, and so forth, may operate in accordance with various examples. When system 100 boots up, system 100 may go through a series of stages until it, for example, loads an operating system and enters a mode during which its normal operation may commence. One of these stages may be a basic input/output system (BIOS) stage during which boot instructions associated with controlling various computing components are loaded and during which an operating system is loaded and readied for initiation. Some of the boot data loaded by the BIOS may be stored in a non-volatile random access memory (NVRAM) data store 120. The boot data 120 stored in the NVRAM may include a variety of BIOS specific persistent data including instructions and configurations associated with booting system 100. In some examples, the NVRAM boot data 120 may be stored in a data structure including a header describing characteristics of the NVRAM boot data structure 120 and a linked list of various atomic NVRAM boot data, sometimes referred to as extensible firmware interface EFI variables. Other data structures for the NVRAM boot data 120 may be used in other scenarios.

Both the header and the EFI variables may be subject to attack by malicious entities, potentially leading to damage to system 100. Consequently, some systems 100 may include a variety of checks for determining whether the NVRAM boot data 120 is uncompromised prior to using the NVRAM boot data 120 during the startup. One of these validity checks may be over the data structure itself, by a validity check module 130. When corruption is detected by validity check module 130, a NVRAM repair module 140 may be able to restore NVRAM boot data 120 to a known valid state. However, each validity check performed during a boot process takes time to preform, and it may be desirable to reduce overall startup times because users dislike waiting for devices to start after powering the devices on.

Consequently, system 100 includes a secure storage 110 that contains a validity indicator that indicates whether the NVRAM boot data structure is valid. Secure storage 110 may be, for example, a complementary metal-oxide-semiconductor (CMOS) integrated circuit. In other examples, secure storage 110 may be a secure embedded controller that uses specialized security settings for storing especially sensitive data used to prevent malicious attacks and/or non-malicious errors from damaging or compromising system 100. For example, storing the validity indicator in secure storage 110 may facilitate recovery from data corruption due to, a boot failure, a power a failure during an NVRAM update, and so forth that result in non-malicious destruction of data that is used during the boot of system 100.

When the validity indicator states that the NVRAM boot data structure is valid during a boot, validity check module 130 may launch boot module 150 which may begin proceeding with booting system 100. However, to detect whether corruption of the NVRAM boot data structure has occurred, boot module 150 may first set the validity indicator to indicate the NVRAM boot data structure is invalid. Upon reaching an execution point in the startup process that indicates boot of system 100 will be successful, boot module 150 may then set the validity indicator back stating the NVRAM boot data structure is valid. This may ensure that validity check module 130 sees that the NVRAM boot data is valid during the next boot of system 100. Example execution points may include, for example, just before handing of control of system 100 to an operating system, the completion of a driver execution environment phase, and so forth.

In the event that startup fails, boot module 150 may not reach the execution point that triggers restoring the validity indicator to the state that indicates the NVRAM boot data structure is valid. Consequently, the next time system 100 is booted after this failure, validity check module 130 may see that the NVRAM boot data structure is potentially invalid. This may cause validity check module 130 to perform a check of the NVRAM boot data structure, and trigger NVRAM repair module 140 in the event corruption of the NVRAM boot data structure is detected. NVRAM repair module 140 may then fix errors in the boot data structure by restoring NVRAM boot data 120 or a portion thereof to a known valid prior state.

It is valuable to appreciate that bypassing integrity checking of the NVRAM boot data structure is different from bypassing integrity checking of NVRAM boot data 120 itself. Checking the integrity of the NVRAM boot data for corrupted entries may be a separate step that is used to ensure proper startup, security, and so forth, that is not skipped when the validity indicator states that the NVRAM boot data structure is valid. When the NVRAM boot data structure is corrupted, startup may eventually hang because a piece of data may not be reached, and the techniques set forth above may detect this failure the next time the system boots. When NVRAM boot data 120 itself is compromised by a malicious attack, the attacker may be able to take control of system 100 and/or steal data from system 100. Checking NVRAM boot data itself 120 may include actions that are performed between boot module 150 setting the validity indicator in data store 110 to an invalid state and boot module 150 setting the validity indicator to the valid state upon boot module 150 reaching the execution point in the startup process that indicates successful startup of system 100. Effectively, boot module 150 treats reaching this execution point in the startup process as implied proof that the NVRAM boot data structure is valid, and the startup process does not need to be restarted so the NVRAM boot data structure can be repaired.

In some examples it may be desirable for validity check module to verify the NVRAM boot data structure despite the validity indicator in secure storage 110 indicating the NVRAM boot data structure is valid. For example, when secure storage 110 is a CMOS, it may be possible for the CMOS to be corrupted by, for example, a malicious actor, removal of a CMOS battery from system 100, and so forth. To check for an invalid CMOS, validity check module may calculate a checksum for the CMOS and compare it to a checksum stored in the CMOS. If these do not match, then validity check module 130 may take the time to verify the integrity of the NVRAM boot data structure. Alternatively, a sophisticated denial of service attack seeking to prevent use of system 100 may be able to manipulate the integrity value while maintaining a corrupted NVRAM boot data structure. Thus, validity check module 130 may, for a brief period of time after system 100 is powered on, monitor for a user input intended to trigger a more thorough check of the NVRAM boot data structure. When the user input is detected, validity check module 130 may validate the NVRAM boot data structure. The user input may be, for example, a double tap of a power button of system 100, a combination of key presses of a keyboard attached to system 100, and so forth. Including this type of user input monitoring may facilitate resolving hung systems using technical support services without replacing physical components of system 100.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
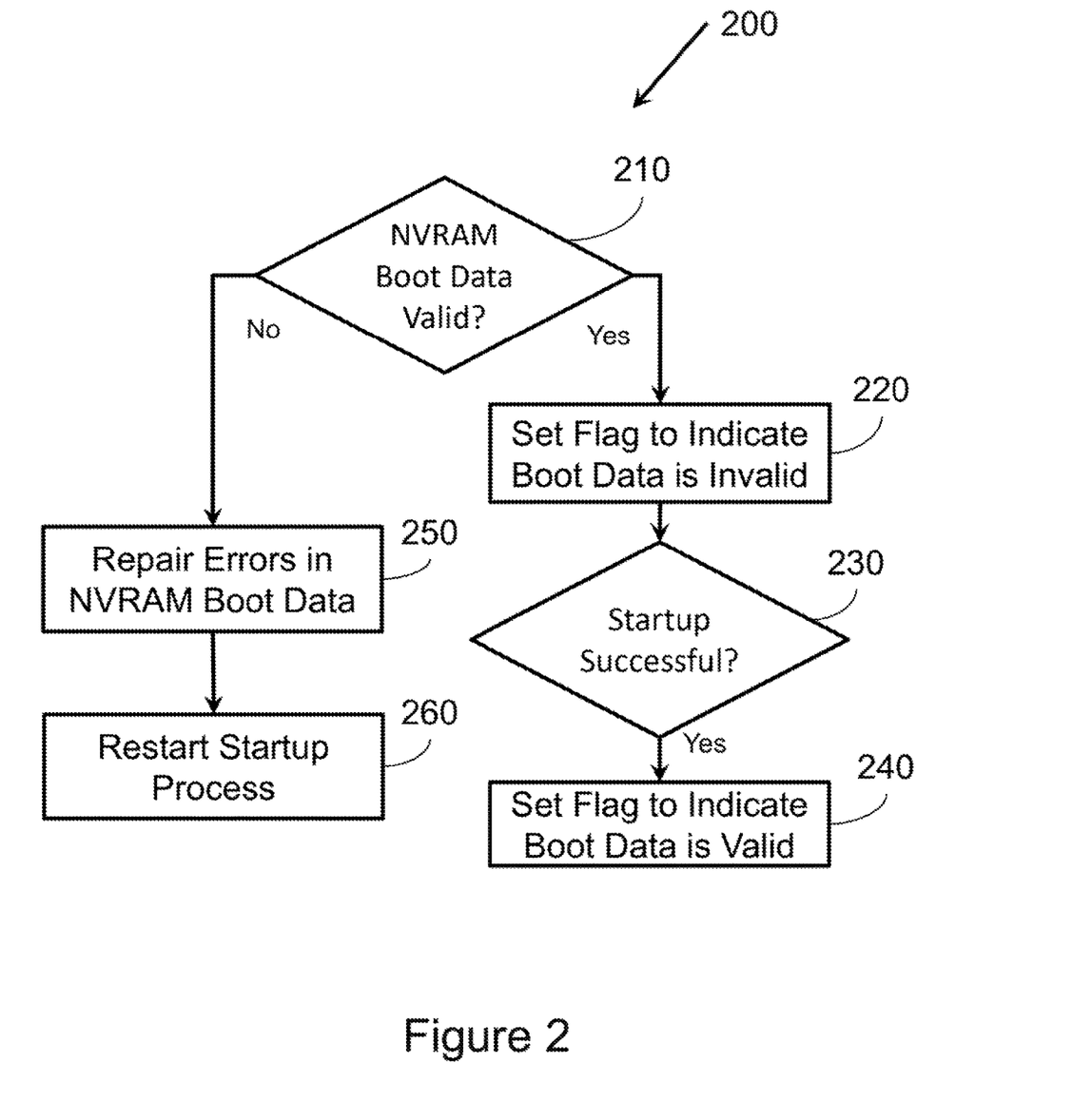
FIG. 2 illustrates a flowchart of example operations an example system associated with boot data validity.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with boot data validity. In various examples, method 200 may be performed by a system or device operating in a basic input/output system (BIOS) mode as a part of a startup process for initiating an operating system on the system or device. Method 200 includes determining whether a non-volatile random access memory (NVRAM) boot validity flag indicates a valid NVRAM boot data structure at 210. The NVRAM boot data may include a data structure storing NVRAM runtime data and configurations associated with booting an operating system. In some examples, the data structure may be a header and linked list. When the boot validity flag indicates a valid NVRAM boot data structure, method 200 may proceed to action 220 and set the NVRAM boot validity flag to indicate the NVRAM boot data structure is invalid. Method 200 may then proceed with a startup process until it reaches a point in the startup process indicating the startup process will be successful. Upon reaching this point at action 230, method 200 may proceed to action 240 and set the NVRAM boot validity flag to indicate the NVRAM boot data structure is valid. If the startup process fails to reach the point at which the startup process will be successful, the NVRAM boot validity flag may remain in a state indicating the NVRAM boot data structure is invalid. This may cause different actions to be taken on a subsequent boot.

For example, if it is determined at action 210 that the NVRAM boot validity flag indicates an invalid NVRAM boot data structure, method 200 may proceed to action 250 and repair errors identified in the NVRAM boot data structure. Repairing the errors may include, for example, restoring the NVRAM boot data to a known prior valid state by replacing at least a portion of the NVRAM boot data. Method 200 may then proceed to action 260 and restart the startup process.

In some examples, the startup process may only be restarted when an error in the NVRAM boot data is repaired. Thus, in some examples, action 250 may include an inspection phase where the NVRAM boot data structure is examined for errors, followed by a repair phase where those errors are repaired. When no errors are found, method 200 may proceed (e.g., to action 210, with the startup process until reaching the point at which startup will be successful) as though the NVRAM boot validity flag indicates valid NVRAM boot data structure. Alternatively, when no errors are found, the NVRAM boot validity flag may be set to indicate the NVRAM boot data structure is valid and the startup process may continue.

Figure 3:
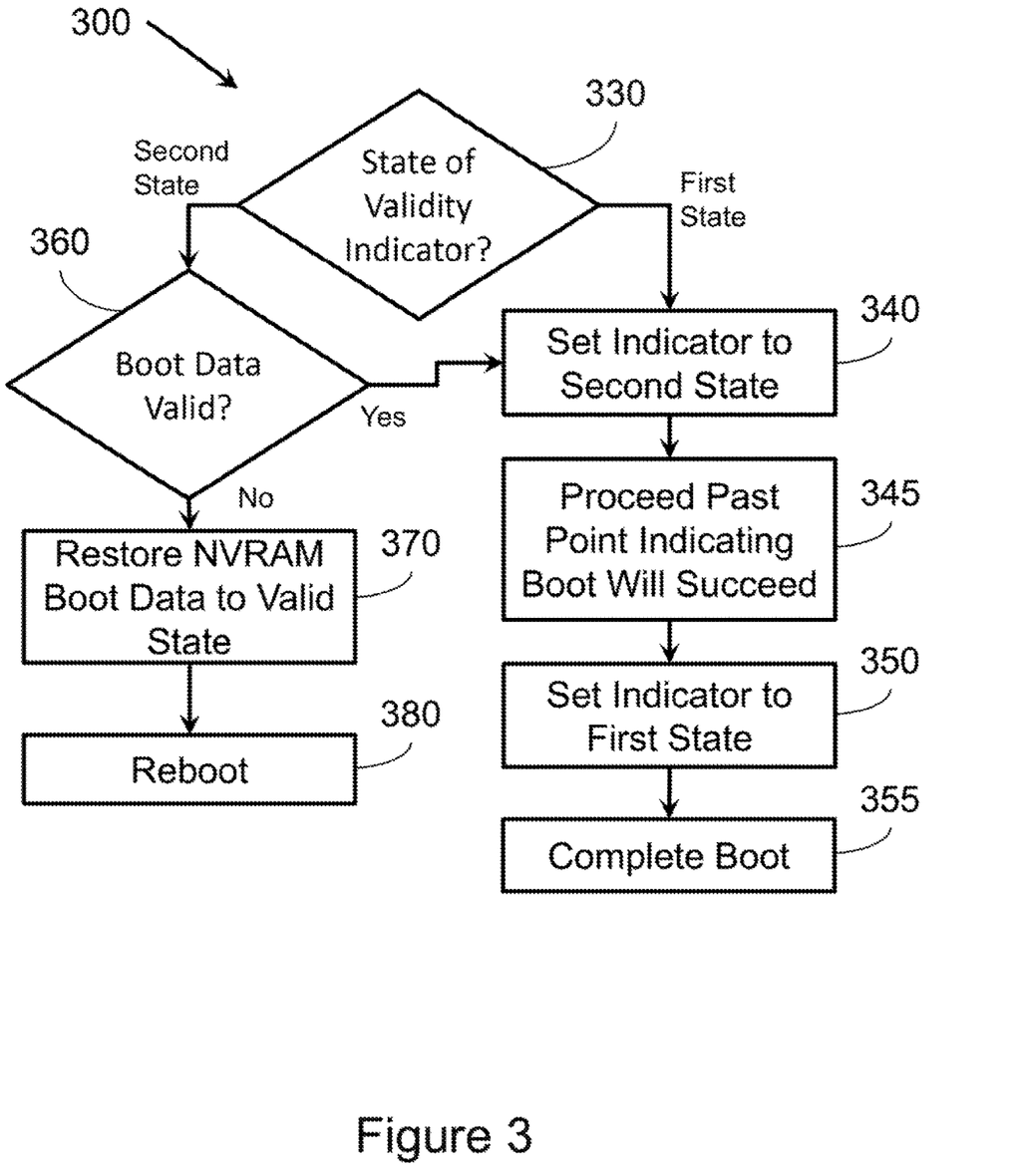
FIG. 3 illustrates another flowchart of example operations associated with boot data validity.

FIG. 3 illustrates a method 300 associated with boot data validity. Method 300 includes determining a state of a validity indicator at action 330. The validity indicator may indicate validity of a non-volatile random access memory (NVRAM) boot data structure of a system. The validity indicator may be stored on, for example, a complementary metal-oxide-semiconductor (CMOS) integrated circuit, a secure storage, and so forth. The NVRAM boot data may include a data structure (e.g., header and linked list) of NVRAM runtime data and configurations associated with booting an operating system stored in the system. When the state of the validity indicator has a first state, method 300 may proceed to action 340 and set the state of the validity indicator to a second state. Method 300 may then proceed to action 345 and proceed with a boot of the system using the NVRAM boot data. When the boot of the system reaches a point a point indicating boot of the system will be successful, method 300 may proceed to action 350 and set the validity indicator back to the first state. Method 300 may then complete boot of the system at action 355.

When the state of the validity indicator is found at action 330 to have the second state, method 300 may proceed to action 360 and determine whether the NVRAM boot data structure is valid. When the NVRAM boot data structure is found to be valid at action 360 method 300 may proceed to action 340 and proceed as though the state of the indicator has the first state. When the NVRAM boot data structure is found to be invalid (e.g., due to corruption) at action 360, method 300 may proceed to action 370 and restore the NVRAM boot data to a known valid state. Method 300 may then reboot the system at action 380.

Figure 4:
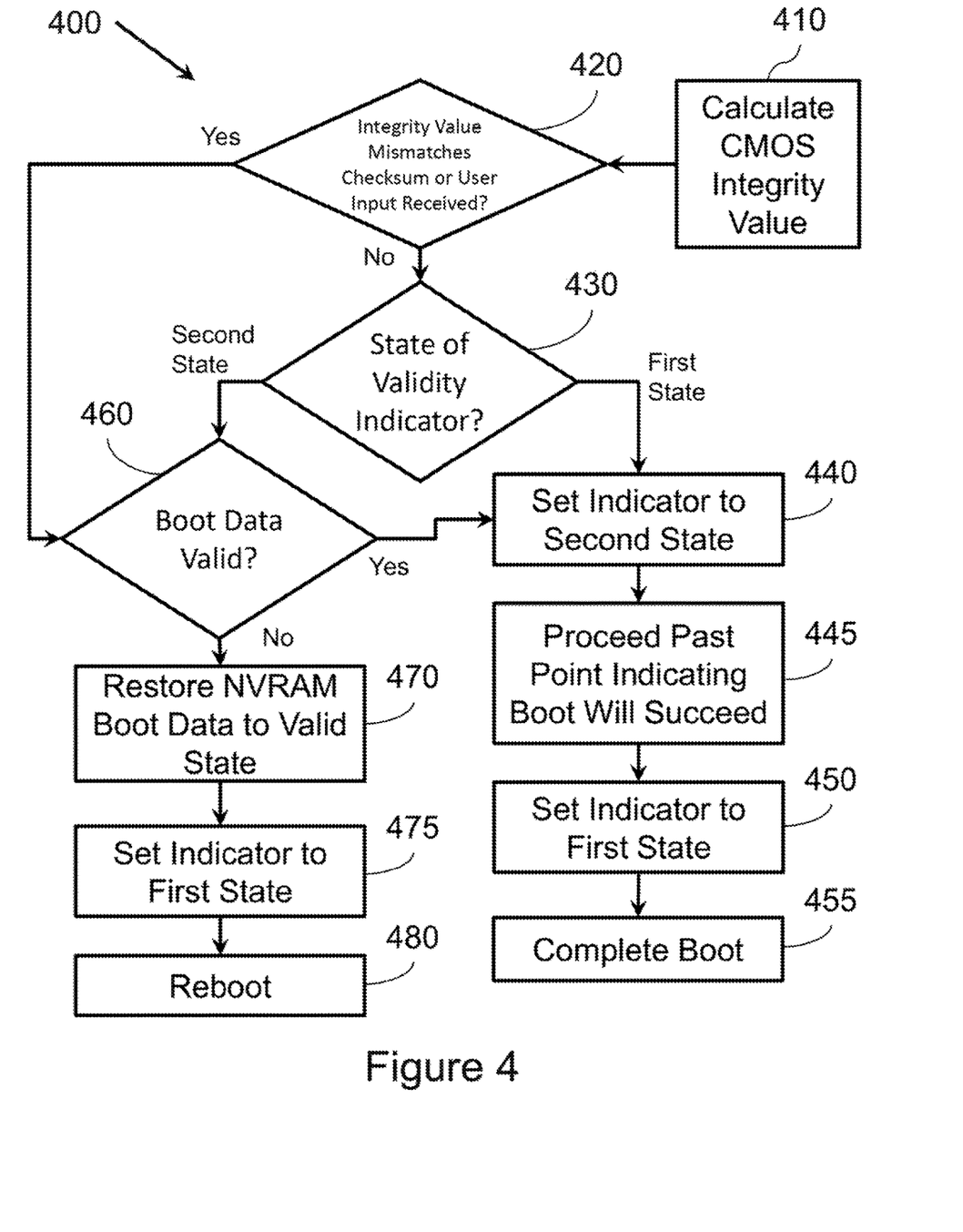
FIG. 4 illustrates another flowchart of example operations associated with boot data validity.

FIG. 4 illustrates a method 400 associated with boot data validity. Method 400 includes several actions similar to those described above with reference to method 300 (FIG. 3). For example, method 400 includes determining a state of a validity indicator at 430, setting the validity indicator to a second state at 440, proceeding past a point indicating boot will succeed at 445, setting the validity indicator to the first state at 450, and completing the boot at 455. When the validity indicator is found to be in the second state at 430, method 400 also includes validating the NVRAM boot data structure at 460, restoring NVRAM boot data to a known valid state at 470, and rebooting the system at 480. Method 400 also include setting the state of the indicator to the first state after restoring the NVRAM boot data to the known valid state at 475.

Method 400 also includes additional validity checks at action 420. For example, for cases where a system performing method 400 relies on a CMOS chip for storing the validity indicator, method 400 includes calculating a CMOS integrity value at 410. The CMOS integrity value may then be compared to a checksum at action 420. If the CMOS integrity value and the checksum match, method 400 may proceed to action 430 and examine the state of the validity indicator as described above. If the integrity value does not match the checksum, it may be assumed that the NVRAM boot data structure should be checked, and therefore method 400 may proceed to action 460 and validate the NVRAM boot data structure. While there may be benign reasons for a mismatched checksum (e.g., a power failure to the CMOS), in other examples, a mismatched checksum may also indicate an attack on the NVRAM that may be cause for checking the integrity of the NVRAM boot data structure. Similarly, at action 420, method 400 may look for a user input indicating a user seeks to validate the NVRAM boot data structure. When the user input is received, method 400 may proceed to action 460, and if the user input is not received, method 400 may proceed to action 430. This may facilitate resolving certain attacks that set the validity indicator to indicate the NVRAM boot data structure as valid, when the NVRAM boot data structure is in fact compromised.

Figure 5:
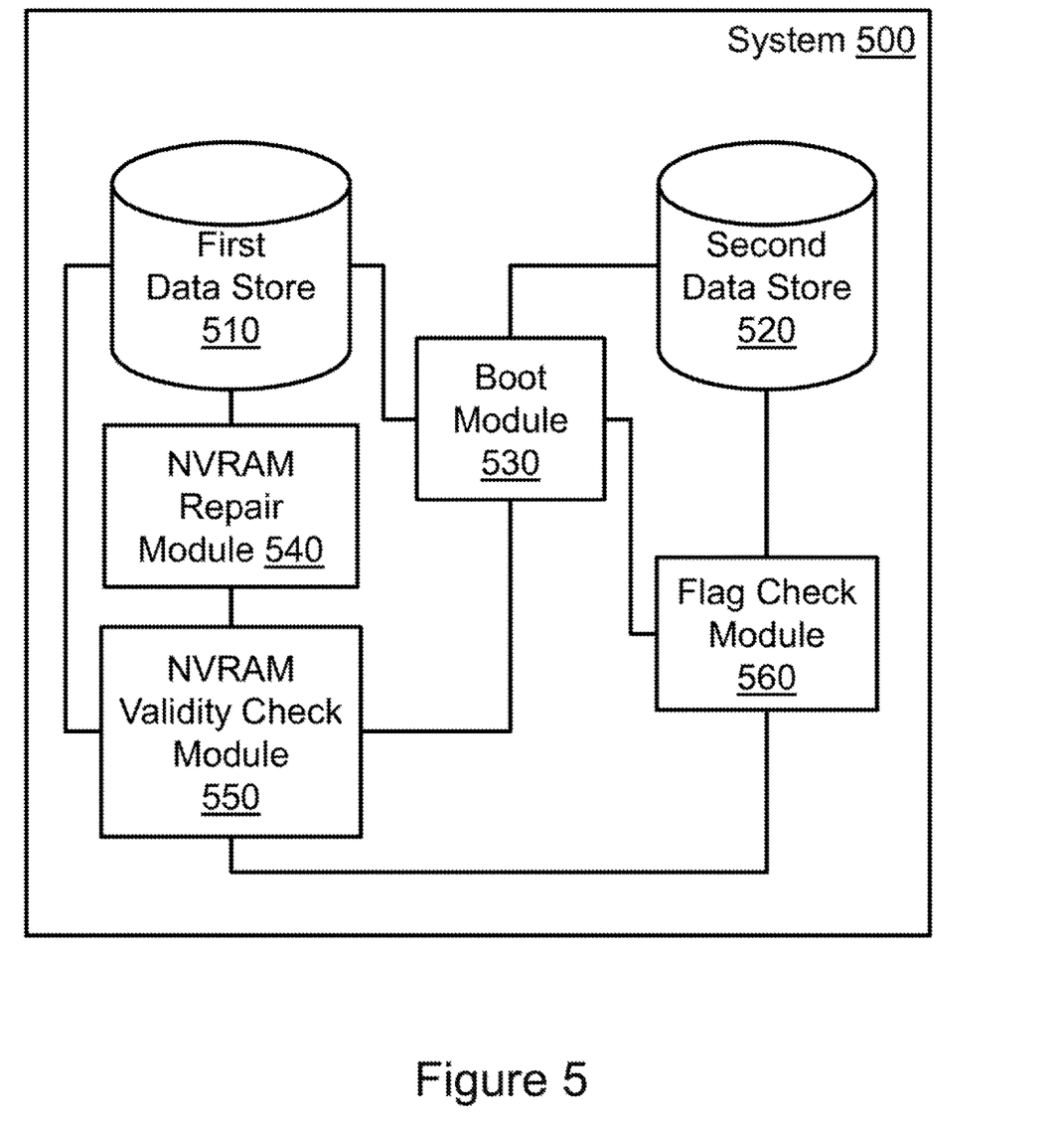
FIG. 5 illustrates an example system associated with boot data validity.

FIG. 5 illustrates a system 500 associated with boot data validity. System 500 includes a first data store 510. First data store 510 may store a set of non-volatile random access memory (NVRAM) boot data in a NVRAM boot data structure.

System 500 also includes a second data store 520. Second data store 520 may store a validity indicator for the NVRAM boot data structure. Second data store 520 may be, for example, a complementary metal-oxide-semiconductor (CMOS) integrated circuit, an embedded controller, a secure storage, and so forth.

System 500 also includes a boot module 530. Boot module 530 may set the validity indicator in second data store 520 to an invalid state. Boot module 530 may proceed with a boot of system 500 to a known execution point. Booting the system may use the NVRAM boot data from first data store 510. Reaching the known execution point may indicate validity of the NVRAM boot data structure. After reaching the known execution point, boot module 530 may set the validity indicator to a valid state, and then complete booting system 500. In one example, the known execution point indicating validity of the NVRAM boot data structure may be completion of a drive execution environment phase of a boot of system 500.

System 500 also includes a NVRAM repair module 540. NVRAM repair module 540 may restore the NVRAM boot data in first data store 510 to a known valid state. NVRAM repair module 540 may then reboot system 500.

System 500 also includes a NVRAM validity check module 550. NVRAM validity check module may validate the NVRAM boot data structure in first data store 510. When the NVRAM boot data structure is found to be invalid by NVRAM validity check module 550, NVRAM validity check module 550 may initiate NVRAM repair module 540. When the NVRAM boot data structure is found to be valid, NVRAM validity check module 550 may initiate boot module 530.

System 500 also includes a flag check module 560. Flag check module 560 may initiate NVRAM validity check module 550 during a boot of the system when the validity indicator in second data store 520 has the invalid state. When the validity indicator has the valid state, flag check module 560 may instead initiate boot module 530.

In some examples, system 500 may also include an interrupt module (not shown). The interrupt module may control initiation of NVRAM validity check module in response to a user input. The input may be received, for example, via a power button of system 500.

Figure 6:
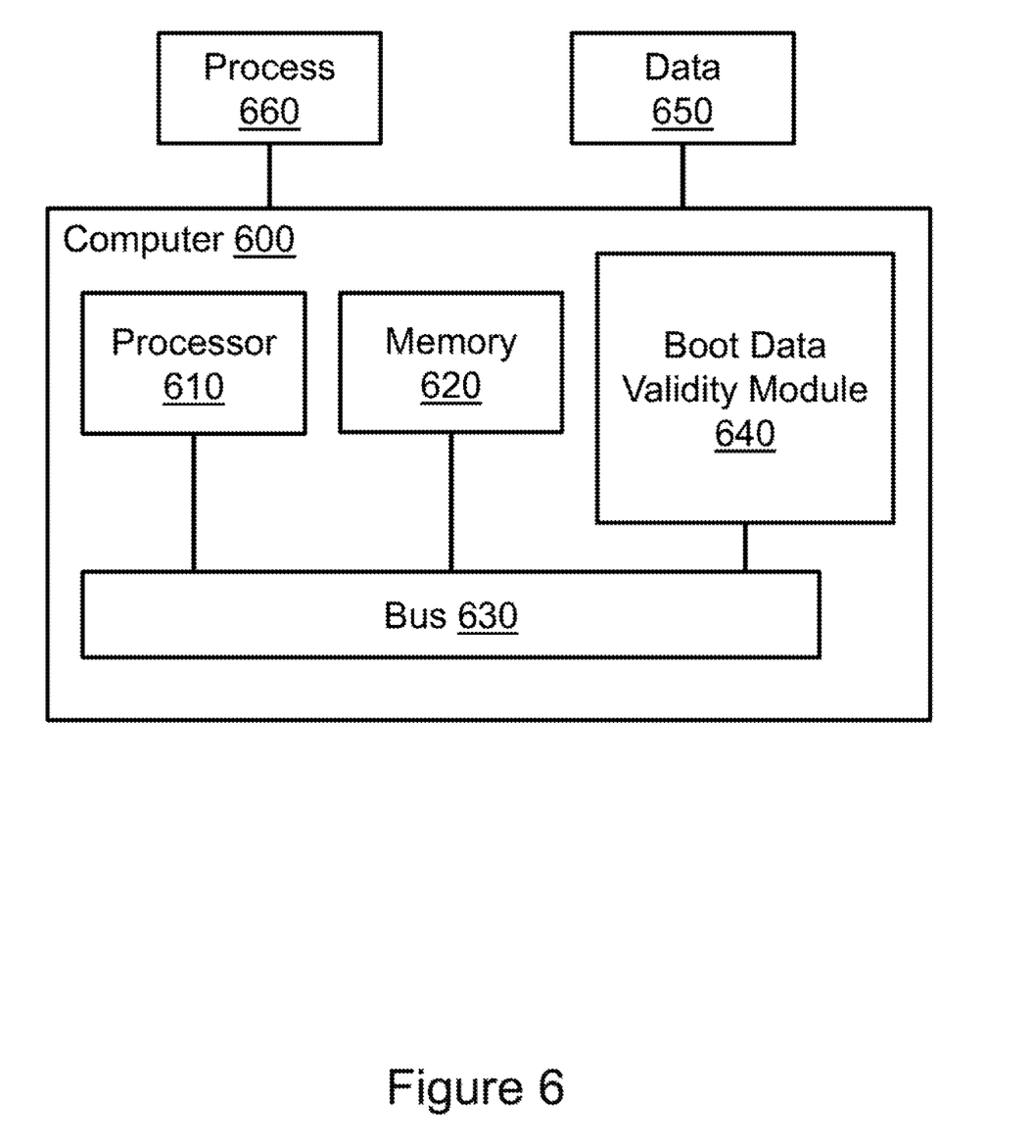
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a boot data validity module 640. Boot data validity module 640 may perform, alone or in combination, various functions described above with reference to the example systems, methods, and so forth. In different examples, boot data validity module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read-only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer-readable medium storing processor-executable instructions that when executed by the processor during a startup process control the processor to:
   upon determining a non-volatile random access memory (NVRAM) boot validity flag indicates valid NVRAM boot data structure:
      set the NVRAM boot validity flag to indicate the NVRAM boot data structure is invalid; and
      set the NVRAM boot validity flag to indicate the NVRAM boot data structure is valid upon reaching a point in the startup process that indicates the startup process will complete successfully, and
   upon determining the NVRAM boot validity flag indicates invalid NVRAM boot data structure:
      repair errors identified in the NVRAM boot data structure; and
      restart the startup process when an error in the NVRAM boot data structure was repaired.

2. The computer-readable medium of claim 1, where the instructions control the processor to proceed as though the NVRAM boot validity flag indicates valid NVRAM boot data structure when no errors are identified in the NVRAM boot data structure.

3. The computer-readable medium of claim 1, where the NVRAM boot data structure is a data structure used to store NVRAM runtime data and configurations associated with booting an operating system by the processor.

4. The computer-readable medium of claim 1, where repairing errors in the NVRAM boot data structure includes restoring the NVRAM boot data to a known valid state.

5. A method, comprising:
   when a state of a validity indicator of a non-volatile random access memory (NVRAM) boot data structure of a system has a first state;
   setting the state of the validity indicator to a second state;
   proceeding with a boot of the system using NVRAM boot data in the boot data structure past a point indicating boot of the system will be successful;
   setting the state of the validity indicator to the first state; and
   completing boot of the system, and
   when the state of the validity indicator has the second state;
   validating the NVRAM boot data structure;
   proceeding as though the state of the validity indicator has the first state when validation of the NVRAM boot data structure indicates valid NVRAM boot data structure; and
   restoring the NVRAM boot data structure to a known valid state and rebooting the system when validation of the NVRAM boot data structure indicates corruption of the NVRAM boot data structure.

6. The method of claim 5, comprising setting the state of the validity indicator to the first state after restoring the NVRAM boot data structure to the known valid state.

7. The method of claim 5, where the NVRAM boot data structure comprises a header and a linked list used to store NVRAM runtime data and configurations associated with booting an operating system stored in the system.

8. The method of claim 5, where the validity indicator is stored in a complementary metal-oxide-semiconductor (CMOS) integrated circuit.

9. The method of claim 8, comprising:
   calculating an integrity value of the CMOS integrated circuit; and
   proceeding as though the indicator has the second state when one of, the integrity value does not match a checksum stored for the CMOS, and a user input is received that controls validating the NVRAM boot data structure.

10. The method of claim 5, where the indicator is stored in a secure storage.

11. A system, comprising:
    a first data store to store a set of NVRAM boot data in an NVRAM boot data structure;
    a second data store to store a validity indicator for the NVRAM boot data structure;
    a boot module to, set the validity indicator to an invalid state, proceed with a boot of the system to a known execution point indicating validity of the NVRAM boot data structure, set the validity indicator to a valid state, and complete boot of the system;
    a NVRAM repair module to restore the NVRAM boot data to a known valid state and reboot the system;
    a NVRAM validity check module to validate the NVRAM boot data structure, initiate the NVRAM repair module when the NVRAM boot data structure is found to be invalid, and initiate the boot module when the NVRAM boot data structure is found to be valid; and
    a flag check module to initiate the NVRAM validity check module during a boot of the system when the validity indicator has the invalid state, and to initiate the boot module when the validity indicator has the valid state.

12. The system of claim 11, where the known execution point indicating validity of the NVRAM boot data structure is completing a driver execution environment phase.

13. The system of claim 11, where the second data store is one of a complementary metal-oxide-semiconductor (CMOS) integrated circuit and an embedded controller.

14. The system of claim 11, comprising an interrupt module to control initiation of the NVRAM validity check module in response to a user input.

15. The system of claim 14, where the input is received via a power button of the system.

\* \* \* \* \*